United States Patent

[11] 3,573,548

[72] Inventor Felix H. Bachofen
 Oberentfelden, Switzerland
[21] Appl. No. 877,774
[22] Filed Nov. 18, 1969
[45] Patented Apr. 6, 1971
[73] Assignee I.T.E. Imperial Corporation
 Philadelphia, Pa.

[54] CURRENT ZERO ANTICIPATING DEVICE
 8 Claims, 5 Drawing Figs.
[52] U.S. Cl. .................................................. 317/11,
 307/133, 335/19
[51] Int. Cl. ...................................................... H02h 3/00
[50] Field of Search .......................................... 335/18, 19;
 336/180, 178, 173, 194, 175; 307/133; 317/11.1

[56] References Cited
 UNITED STATES PATENTS
3,313,982 4/1967 Sequin ........................... 307/133X
3,388,361 6/1968 Kesselring .................... 335/281

Primary Examiner—J. D. Miller
Assistant Examiner—Ulysses Weldon
Attorney—Ostrolenk, Faber, Gerb and Soffen ABSTRACT: A magnetic circuit consists of a large-area unsaturable section which is in closed series relation with a small-area saturable section. The circuit is located with respect to a current conductor so that the magnetic flux of the conductor flows through the large-area and small-area sections in parallel. The large-area section has an air gap and receives a winding which is closed through a resistance-capacitance circuit. The circulating flux induced in the winding is related to the rate of change of current in the adjacently positioned conductor and is phase shifted in a leading direction. An output winding on the saturable section has output pulses generated therein at times leading the current zero in the conductor by a fixed amount.

Patented April 6, 1971
3,573,548
2 Sheets-Sheet 1
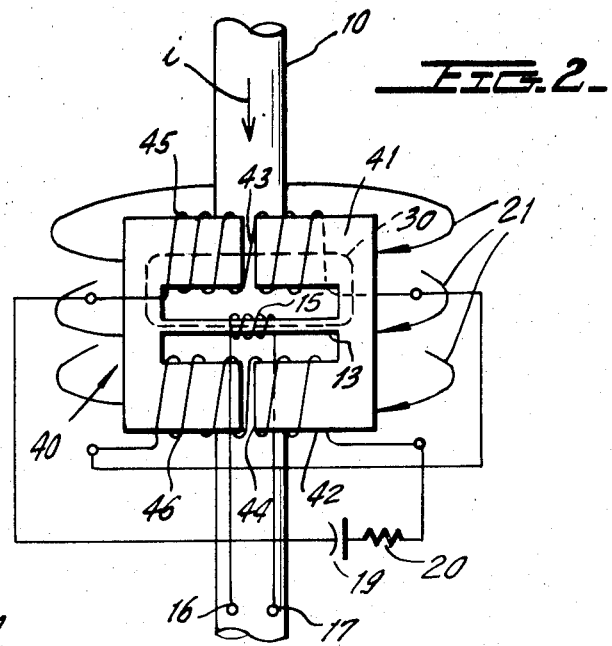
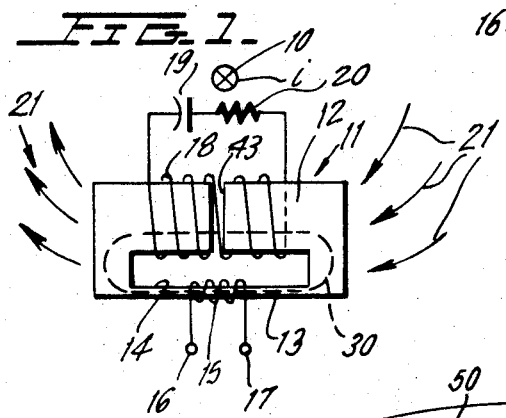
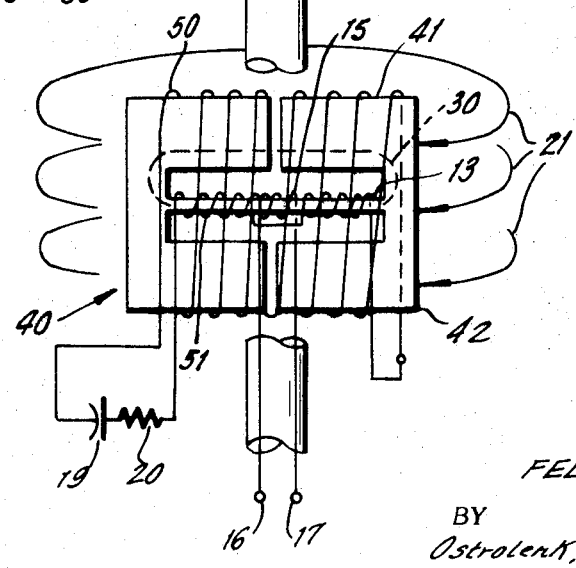
INVENTOR.
FELIX H. BACHOFEN
BY
Ostrolenk, Faber, Gerb & Soffen
ATTORNEYS

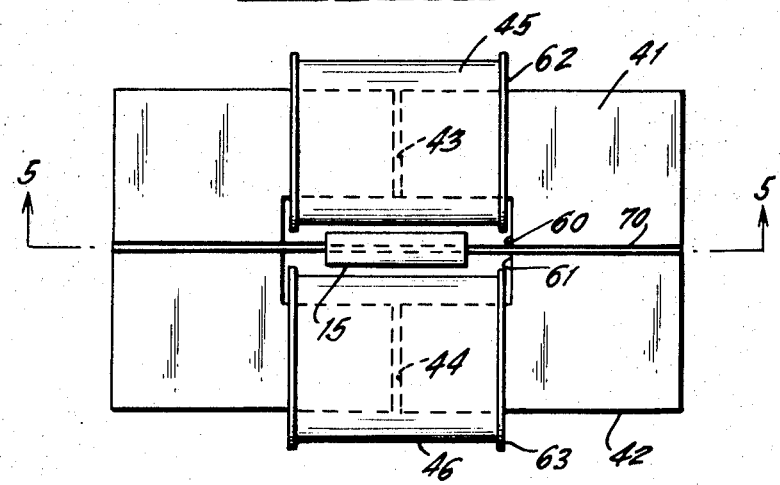
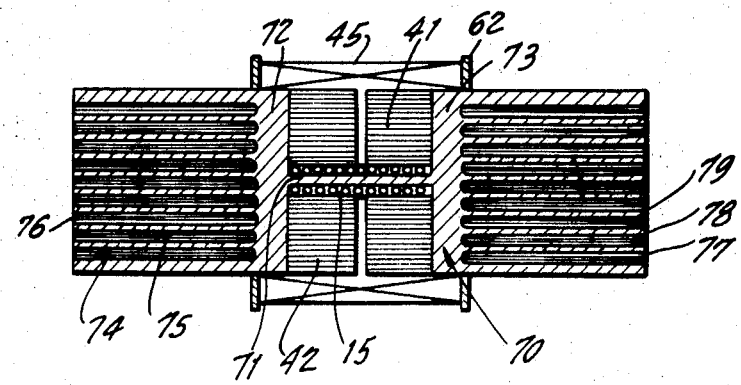

3,573,548

CURRENT ZERO ANTICIPATING DEVICE

RELATED DISCLOSURES

This application is an improvement of the structure shown in U.S. Pat. No. 3,388,361, in the name of Kesselring, dated Jun. 11, 1968 and is an improvement of the structure shown in my copending application Ser. No. 811,815, now U.S. Pat. No. 3,530,303 filed Apr. 1, 1969, entitled "Current Zero Anticipating Circuit," and assigned to the assignee of the present invention.

BACKGROUND OF INVENTION

This invention relates to a magnetic circuit for generating an output signal some predetermined time prior to a current zero in a circuit which is being monitored, where this signal may be used to operate circuit interruption equipment which is to open just prior to the time that the current passes through zero.

Circuits for producing output signals prior to a current zero are well known for the purpose of operating circuit interrupters such that they interrupt circuits immediately prior to a current zero in the circuit. A circuit performing this operation and using numerous electronic-type devices is shown in the U.S. Pat. to Nitta et al. No. 3,315,169. A magnetic structure for serving this purpose is shown in the U.S. Pat. to Kesselring No. 3,388,361. The structure of the Kesselring U.S. Pat. No. 3,388,361, however, had certain drawbacks when the current being monitored was asymmetric.

The structure of my copending application Ser. No. 811,815, now U.S. Pat. No. 3,530,303 modified this magnetic structure so that appropriate signals were generated whether the current being monitored was symmetric or asymmetric. More specifically, in the device shown in my above-noted application, a magnetic core is disposed around the primary conductor which is being monitored and a distributed secondary winding is wound around this core. Since the flux that induces voltage in the secondary winding may differ from the flux producing the magnetic voltage drop across the air gap in the magnetic circuit variations of the pretime (the time at which a signal is generated prior to a current zero in the circuit being monitored) may occur if the primary conductor is not straight or not mounted in the center of the core. Moreover, in three-phase application, the magnetic field of neighboring phases might influence the voltage induced in the secondary windings, thus causing errors in the pretime.

SUMMARY OF INVENTION

The present invention provides a novel magnetic circuit which is mechanically simpler to manufacture than the magnetic structure shown in my copending application Ser. No. 811,815, now U.S. Pat. No. 3,350,303 and further permits the positive shielding of the output magnetic circuit from parasitic fields, and permits improved flexibility of adjustment of the time prior to a current zero that an output signal is generated.

With the present invention the same flux which induces voltage in the secondary winding is used to produce a magnetic voltage drop across the air gap in the magnetic circuit. Thus, the shape of the primary conductor cannot influence the pretime. Furthermore, the influence of neighboring phases can be reduced to a minimum and negligible amount by the proper choice of the mounting location of the three-phase conductors. Furthermore, the device of the invention is smaller and lighter and less expensive than those of the prior art and is easier to assemble and mount particularly where the primary conductor being monitored has a large diameter.

BRIEF DESCRIPTION OF DRAWINGS

FIG. 1 schematically illustrates the structure of the present invention.

FIG. 2 shows a modification of the structure of FIG. 1 wherein the output winding is positively shielded from parasitic fields.

FIG. 3 shows a further modification of the circuits of FIGS. 1 and 2 wherein a separate winding is provided for picking up the induced voltage and for applying magnetic voltages to the magnetic circuit.

FIG. 4 is a side elevation view of the embodiment schematically illustrated in FIG. 2.

FIG. 5 is a cross-sectional view of FIG. 4 taken across the section line 5–5 in FIG. 4.

DESCRIPTION OF ILLUSTRATED EMBODIMENTS

Referring first to FIG. 1, there is illustrated a conductor 10 schematically illustrated by the cross to be conducting current $i$ into the plane of the drawing where the current $i$ is the current being monitored by the magnetic circuit of the invention. A magnetic structure 11 is located adjacent conductor 10 and can be spaced therefrom and mounted in respect thereto in any desired manner. The magnetic structure 11 includes a relatively large-area portion 12 having an air gap 43 therein and a relatively small-area saturable region 13. Large-area region 12 and small-area region 13 define a window 14. An output winding 15, having terminals 16 and 17, is then wound on the small-area region 13 while a secondary winding 18 is wound on the large-area region 12 and is terminated through the phase shifting circuit including capacitor 19 and resistor 20. The magnetic flux of conductor 10 is shown by the arrows 21 and it is seen that the arrows 21 pass through nonsaturable section 12 of magnetic structure 11, thereby creating a magnetic voltage drop across the air gap 43. The same flux also induces a voltage in secondary winding 18.

The voltage induced in winding 18 is proportional to the rate-of-change of the current $i$ and causes a secondary current to flow in winding 18 which is phase shifted in a leading direction because of the capacitive load impedance of the resistor-capacitor circuit including capacitor 19 and resistor 20. The values of capacitor 19 and resistor 20 are selected such that the phase angle between the secondary current and the induced voltage is equal to $wt_k/2$ where $w$ is the angular frequency of the current $i$, and $t_k$ is the pretime or the time interval between a signal being generated in winding 15 and a current zero for the current $i$ in the circuit being monitored.

The flux generated by winding 18 flows around the magnetic circuit 11 and is shown as the flux 30.

The magnetic flux 21 also flows through saturable section 13 such that when the sum of the magnetic voltages within section 13 goes through zero, an output voltage is induced in winding 15 and applied to terminals 16 and 17. The sum of the magnetic voltages in saturable section 13 consists of the magnetic voltage drop caused by flux 21 plus the ampere turns of the current induced in secondary winding 18. If the air gap 13 has the proper width, this sum goes through zero at a time $t_k$ before the current $i$ goes through zero. Thus, flux in section 13 passes through zero at the predetermined fixed time prior to a current zero in conductor 10 and an output signal is generated at this pretime.

It is to be noted that this timing is unaffected by the configuration of the conductor 10.

FIG. 2 illustrates a modification of the magnetic structure of FIG. 1 wherein the output winding 15 is positively shielded from parasitic or stray magnetic fields. In FIG. 2 those components which are identical to the components of FIG. 1 are given identical numerals. In FIG. 2, the major difference from FIG. 1 is in the configuration of the magnetic core 40 which replaces core 11 of FIG. 1. Thus, the magnetic core 40 of FIG. 2 has two relatively large-area sections 41 and 42 instead of the single large-area section 12 of FIG. 1. Each of sections 41 and 42 in FIG. 2 have air gaps 43 and 44, respectively, and receive respective secondary windings 45 and 46. Secondary windings 45 and 46 are connected in series with one another and with the phase shifting circuit including capacitor 19 and resistor 20. This arrangement operates in a manner identical to that described in FIG. 1 except that stray magnetic fields such as fields from adjacent phases cannot affect the flux in area 13.

FIG. 3 shows an embodiment of the invention which simplifies the adjustment of pretime. In FIG. 3 those components identical to components of FIG. 2 are given identical numerals. In FIG. 3 the arrangement of windings on the magnetic core of FIG. 2 is modified such that a first winding 50 encircles the entire core structure while a second series winding portion 51 encircles the saturable core section 13 and serves as a tertiary winding. The pretime of the device can then be adjusted by adjusting the number of turns of winding 50 or the number of turns of winding 51. Thus, in the arrangement of FIGS. 1 and 2, the secondary winding served two purposes: picking up the voltage induced by the flux 21, and applying a magnetic voltage to the closed magnetic circuit. In the arrangement of FIG. 3, there is a separate winding for each of these purposes. The secondary winding 50 is used to pick up the induced voltage while the tertiary winding 51 applies this magnetic potential to the magnetic circuit.

FIGS. 4 and 5 illustrate an embodiment of the invention following the schematic illustration of FIG. 2. Referring to FIGS. 4 and 5, magnetic core portions 41 and 42 are formed of stacks of magnetic laminations which may be interleaved with respect to one another and have polished air gaps defining air gaps 43 and 44. The lamination stacks 41 and 42 are cut away at their central regions to define the windows 60 and 61 which receive windings 45 and 46 which are wound on bobbins 62 and 63, respectively. The saturable section 13 of the magnetic structure is then formed by a single lamination of magnetic material, preferably one having a square loop hysteresis characteristic, shown in FIG. 5 as lamination 70 and shown in FIG. 4 as being disposed between the lamination stacks 41 and 42. Lamination 70 has a narrow section or web 71 extending between widened sections 72 and 73. The use of the widened sections 72 and 73 permit a low-reluctance connection to the nonsaturable lamination stacks 41 and 42. Web 71 corresponds to saturable section 13 in FIG. 2.

In order to minimize eddy currents, widened sections 72 and 73 are provided with numerous slots, such as slots 74, 75, 76 for section 72 and slots 77, 78 and 79 for portion 73. Winding 15 is wound on web 71 of lamination 70.

Although this invention has been described with respect to preferred embodiments, it should be understood that many variations and modifications will now be obvious to those skilled in the art, and, therefore, the scope of this invention is limited not by the specific disclosure herein, but only by the appended claims.

I claim:
1. In combination; a conductor and a magnetic circuit for generating an output signal prior to a current zero in said conductor; said conductor being magnetically coupled to said magnetic circuit; said magnetic circuit comprising a closed magnetic path having a first relatively large area and unsaturable section, a second relatively smaller area and saturable section, and a window between said first and second sections; and output winding wound on said saturable section; a secondary winding wound for its full extent on said unsaturable section and a resistance-capacitance circuit connected in series with said secondary winding; said unsaturable section having an air gap therein; said conductor being disposed whereby at least a component of the magnetic flux generated thereby flows through said unsaturable sections.

2. The combination of claim 1 wherein said magnetic circuit and said conductor are coupled to one another by air.

3. The combination of claim 1 which further includes a second unsaturable section disposed in parallel with said unsaturable and saturable section and defining a closed magnetic path with said saturable section; an air gap in said second section; and a third winding wound on said second section and connected in series with said secondary winding.

4. The combination of claim 3 wherein said saturable section is disposed between said unsaturable sections and is shielded thereby from stray magnetic fields.

5. The combination of claim 4 wherein said unsaturable sections consist of respective stacks of magnetic laminations.

6. The combination of claim 5 wherein said saturable section comprises at least one lamination disposed between said stacks forming said unsaturable sections; said at least one lamination having a thin central web joining wide end sections, said output winding wound on said web.

7. The combination of claim 6 wherein said wide end sections are slotted.

8. The combination of claim 1 which further includes a second unsaturable section disposed in parallel with said unsaturable and saturable sections and defining a closed path with said saturable section; an air gap in said second section; said secondary winding wound around both of said unsaturable sections; and a tertiary winding in series with said secondary winding and wound on said saturable section.